United States Patent
Wang et al.

(10) Patent No.: US 8,790,120 B2
(45) Date of Patent: Jul. 29, 2014

(54) ELECTRIC CONNECTOR, BRACKET AND ELECTRIC CONNECTOR ASSEMBLY

(71) Applicant: HTC Corporation, Taoyuan County (TW)

(72) Inventors: Chih-Kuang Wang, Taoyuan County (TW); Yuan-Hung Chang, Taoyuan County (TW); Yun-Long Tun, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 31 days.

(21) Appl. No.: 13/663,486

(22) Filed: Oct. 30, 2012

(65) Prior Publication Data

US 2014/0120745 A1    May 1, 2014

(51) Int. Cl.
*H01R 11/30*    (2006.01)

(52) U.S. Cl.
USPC ............................................ 439/39; 439/700

(58) Field of Classification Search
USPC ..................... 439/38–40, 527, 700
See application file for complete search history.

(56) References Cited

U.S. PATENT DOCUMENTS

| | | | |
|---|---|---|---|
| 7,311,526 B2 | 12/2007 | Rohrbach et al. | |
| 7,517,222 B2 | 4/2009 | Rohrbach et al. | |
| 7,645,143 B2 | 1/2010 | Rohrbach et al. | |
| 7,901,216 B2 | 3/2011 | Rohrbach et al. | |
| 8,523,577 B1* | 9/2013 | Huang et al. | 439/39 |
| 8,529,274 B2* | 9/2013 | Li et al. | 439/38 |
| 8,535,088 B2* | 9/2013 | Gao et al. | 439/490 |
| 2004/0209489 A1 | 10/2004 | Clapper | |
| 2007/0141860 A1 | 6/2007 | Hernandez et al. | |

\* cited by examiner

*Primary Examiner* — Khiem Nguyen

(74) *Attorney, Agent, or Firm* — Jianq Chyun IP Office

(57) ABSTRACT

An electric connector, a bracket, and an electric connector assembly are provided. The electric connector is suitable for connecting a receptacle of a portable electronic device and includes a body, a plug, a sliding base, and a magnetic component. The receptacle has a magnetic component. The plug has a plug portion and a fixed portion fixed to the body. The sliding base has a contact surface and a containing through hole and is suitable for sliding relative to the plug in the containing through hole. The magnetic component of the electric connector is fixed to the sliding base; magnetic polarities of the magnetic components of the electric connector and the receptacle are different. When the electric connector approaches the receptacle, the magnetic components of the electric connector and the receptacle are magnetically attracted, so that the containing through hole is aligned to the receptacle. The electric connector is pushed toward the receptacle, and the contact surface leans against the portable electronic device, so that the plug portion protrudes from the contact surface and is inserted into the receptacle.

18 Claims, 4 Drawing Sheets

ELECTRIC CONNECTOR, BRACKET AND ELECTRIC CONNECTOR ASSEMBLY

BACKGROUND OF THE DISCLOSURE

1. Field of the Disclosure

The disclosure relates to an electric connector, a bracket, and an electric connector assembly, and in particular, to an electric connector, a bracket, and an electric connector assembly suitable for a portable electronic device.

2. Description of Related Art

In the information explosion era, e-information obtained through electronic media (e.g., portable electronic devices including notebook computers, tablet computers, and smart phones) has become indispensable in our daily lives. The portable electronic devices are often characterized by compactness and slimness in consideration of the requirement for portability.

In most cases, the existing portable electronic devices obtain the required power after the receptacles of the portable electronic devices are connected to corresponding plugs. Due to the design trend of miniaturization of the portable electronic devices, the receptacles and the corresponding plugs are required to be miniaturized as well. This may lead to the difficulty in aligning the receptacles of the portable electronic devices to the plugs. If a plug is inserted into a receptacle of a portable electronic device at an improper angle, the casing of the portable electronic device is apt to be scratched; what is more, the inappropriate external force exerted on the receptacle may cause damages to the receptacle and may thus result in poor contact between electrodes.

SUMMARY OF THE DISCLOSURE

The disclosure is directed to an electric connector, a plug of which is apt to be aligned to a receptacle of a portable electronic device.

The disclosure is also directed to a bracket for holding a portable electronic device. Through magnetic attraction, a plug of the bracket is apt to be aligned to a receptacle of the portable electronic device.

The disclosure is also directed to an electric connector assembly. Through magnetic attraction between a plug and a casing of the electric connector assembly, the plug is apt to be aligned to a receptacle of a portable electronic device.

In an embodiment of the disclosure, an electric connector suitable for connecting a receptacle of a portable electronic device is provided. The receptacle has at least one magnetic component, and the electric connector includes a body, a plug, a reposition component, a sliding base, and at least one magnetic component. The plug has a plug portion and a fixed portion. The fixed portion is fixed to the body. The reposition component is mounted to the fixed portion of the plug. The sliding base has a contact surface and a containing through hole. The plug is located in the containing through hole, and the sliding base is suitable for sliding relative to the plug. Two ends of the reposition component respectively lean against the body and the sliding base. The magnetic component of the electric connector is fixed to the sliding base and corresponds to the magnetic component of the receptacle, and a magnetic polarity of the magnetic component of the electric connector is different from a magnetic polarity of the magnetic component of the receptacle. When the electric connector approaches the receptacle, the magnetic component of the electric connector on the sliding base and the magnetic component of the receptacle are magnetically attracted, such that the containing through hole of the sliding base is aligned to the receptacle. At this time, the electric connector is pushed toward the receptacle, and the contact surface of the sliding base leans against the portable electronic device and slides relative to the plug toward the body, such that the plug portion of the plug protrudes from the contact surface and is inserted into and electrically connected to the receptacle.

In an embodiment of the disclosure, a bracket suitable for connecting a receptacle of a portable electronic device is provided. The receptacle has at least one magnetic component. The bracket includes a body, a plug, a reposition component, a sliding base, and at least one magnetic component. The body has an accommodation chamber, and at least one portion of the portable electronic device is adapted to be inserted into the accommodation chamber. The plug has a plug portion and a fixed portion. The fixed portion is fixed into the accommodation chamber of the body. The reposition component is mounted to the fixed portion of the plug. The sliding base has a contact surface and a containing through hole. The plug is located in the containing through hole, and the sliding base is suitable for sliding relative to the plug. Two ends of the reposition component respectively lean against the body and the sliding base. The magnetic component of the bracket is placed on the sliding base and corresponds to the magnetic component of the receptacle. A magnetic polarity of the magnetic component of the electric connector is different from a magnetic polarity of the magnetic component of the receptacle. When the portable electronic device is to be inserted into the accommodation chamber of the bracket, the magnetic component of the electric connector on the sliding base and the magnetic component of the receptacle are magnetically attracted, such that the containing through hole of the sliding base is aligned to the receptacle. At this time, the portable electronic device is pushed toward the sliding base, and the contact surface of the sliding base leans against the portable electronic device and slides relative to the plug toward the body, such that the plug portion of the plug protrudes from the contact surface and is inserted into and electrically connected to the receptacle.

In an embodiment of the disclosure, an electric connector assembly suitable for connecting a receptacle of a portable electronic device is provided. The electric connector assembly includes an electric connector and a casing. The electric connector includes a body, a plug, a reposition component, a sliding base, and at least one magnetic component. The plug has a plug portion and a fixed portion, and the fixed portion is fixed to the body. The reposition component is mounted to the fixed portion of the plug. The sliding base has a contact surface and a containing through hole. The plug is located in the containing through hole, and the sliding base is suitable for sliding relative to the plug. Two ends of the reposition component respectively lean against the body and the sliding base. The magnetic component of the electric connector is placed on the sliding base. The casing of the electric connector assembly covers a portion of the portable electronic device and exposes the receptacle. Here, the casing of the electric connector assembly has at least one magnetic component corresponding to the magnetic component of the electric connector. A magnetic polarity of the magnetic component of the electric connector is different from a magnetic polarity of the magnetic component of the casing. When the electric connector approaches the receptacle, the magnetic component of the electric connector on the sliding base and the magnetic component of the casing are magnetically attracted, such that that the containing through hole of the sliding base is aligned to the receptacle. At this time, the electric connector is pushed toward the receptacle, and the contact surface of the sliding base leans against the portable electronic device and slides relative to the plug in a direction away from the receptacle, such that the plug portion of the plug protrudes from the contact surface and is inserted into and electrically connected to the receptacle.

In view of the above, the magnetic component is configured on the sliding base of the electric connector, the plug is located in the containing through hole of the sliding base, and another magnetic component having a magnetic polarity different from that of the magnetic component on the sliding base is correspondingly configured on the receptacle of the portable electronic device. Since the magnetic component on the electric connector and the magnetic component on the portable electronic device are magnetically attracted, the plug of the electric connector is able to be aligned to the receptacle of the portable electronic device. Said concept may be further applied to place a magnetic component respectively around the plug of the bracket and the receptacle of the portable electronic device or place a magnetic component respectively around the receptacle of the electric connector and on a corresponding portion of the casing. Thereby, the plug may be easily aligned to the receptacle of the portable electronic device, and the problem of scratching the casing of the portable electronic device (because the plug is inserted into the receptacle of the portable electronic device at an improper angle) and the resultant damages to the receptacle may be prevented.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
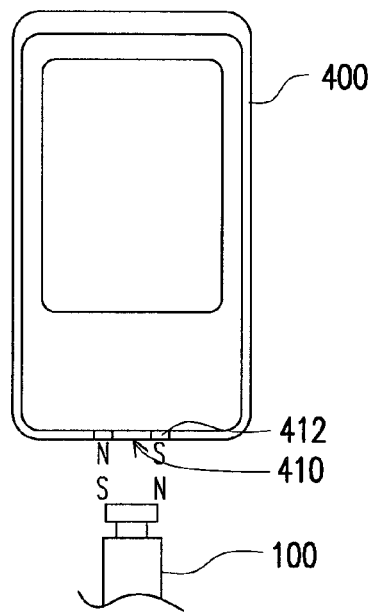
FIG. 1 is a schematic view illustrating an electric connector and a portable electronic device according to an embodiment of the disclosure.
Figure 2:
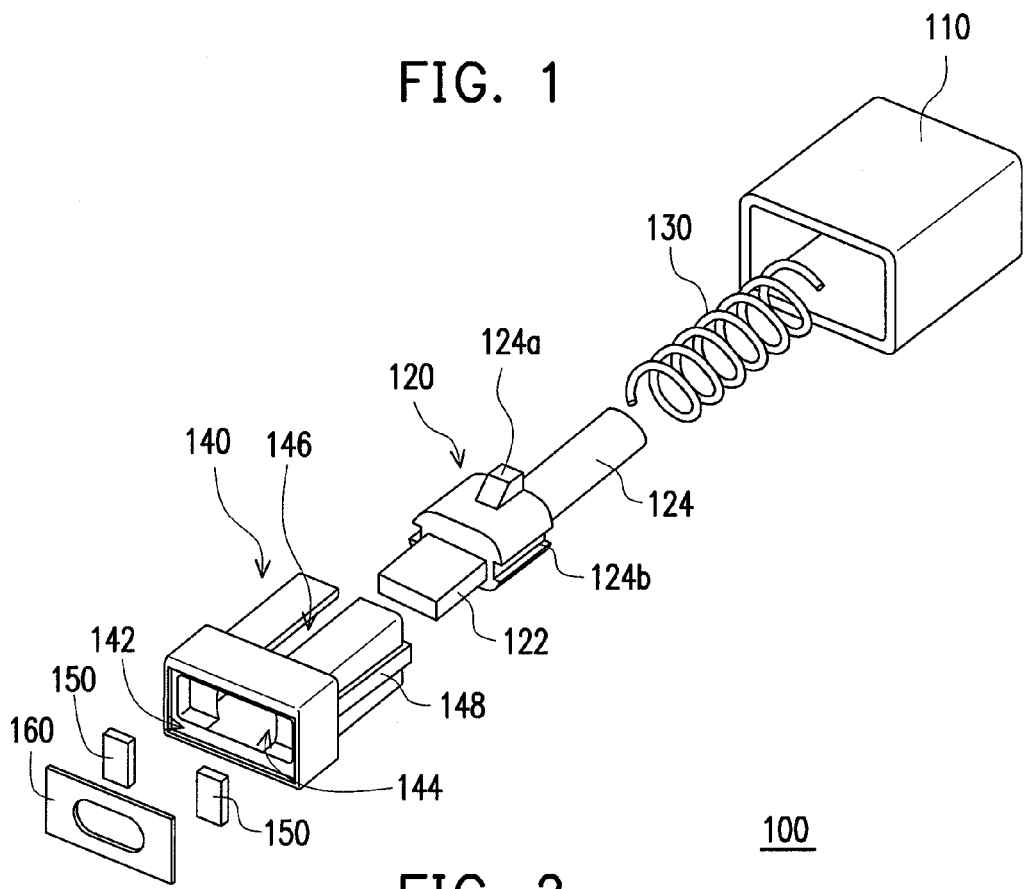
FIG. 2 is a schematic perspective view illustrating the electric connector depicted in FIG. 1.

FIG. 1 is a schematic view illustrating an electric connector and a portable electronic device according to an embodiment of the disclosure. FIG. 2 is a schematic perspective view illustrating the electric connector depicted in FIG. 1. With reference to FIG. 1 and FIG. 2, an electric connector 100 described in the present embodiment is suitable for connecting a receptacle 410 of a portable electronic device 400. In the present embodiment, the portable electronic device 400 may be a smart phone, and the electric connector 100 may serve as an electric connector of a transmission cable or a charger of the smart phone and may be connected to an external power supply to provide the portable electronic device 400 with the required power. Note that the types of the portable electronic device 400 and the electric connector 100 are not limited in the disclosure.

The receptacle 410 of the portable electronic device 400 has at least one magnetic component 412, and the electric connector 100 includes a body 110, a plug 120, a reposition component 130, a sliding base 140, and at least one magnetic component 150. The plug 120 has a plug portion 122 and a fixed portion 124. The plug portion 122 is connected to the fixed portion 124, and the fixed portion 124 is fixed to the body 110. The reposition component 130 is mounted to the fixed portion 124 of the plug 120. The sliding base 140 has a contact surface 142 and a containing through hole 144. The plug 120 is located in the containing through hole 140, and the sliding base 140 is suitable for sliding relative to the plug 120. Two ends of the reposition component 130 respectively lean against the body 110 and the sliding base 140. According to the present embodiment, the reposition component 130 is a helical spring that is mounted to the fixed portion 124. The magnetic component 150 of the electric connector 100 is fixed to the sliding base 140, and a location of the magnetic component 150 of the electric connector 100 corresponds to a location of the magnetic component 412 of the receptacle 410. In the present embodiment, the magnetic component 150 of the electric connector 100 may be adhered to the contact surface 142 of the sliding base 140 through an adhesive tape 160. A magnetic polarity of the magnetic component 150 of the electric connector 100 is different from a magnetic polarity of the magnetic component 412 of the receptacle 410.

Particularly, as shown in FIG. 2, the fixed portion 124 may further include a sliding block 124a and at least one locking portion 124b. Two locking portions 124b are shown in FIG. 2 and are respectively located at two opposite sides of the fixed portion 124. The sliding base 140 may include a sliding groove and at least one locking hook 148 that is extended in a direction away from the contact surface 142. Two locking hooks 148 are shown in FIG. 2 and correspond to the locking portions 124b. The sliding block 124a is slidably configured in the sliding groove 146, such that the sliding base 140 is suitable for sliding relative to the plug 120. When the sliding base 140 slides relative to the plug 120 in a direction away from the body 110, the locking hooks 148 are adapted to be locked to the locking portions 124b, so as to limit the sliding base 140 to be located on the plug 120. On the contrary, when the sliding base 140 slides relative to the plug 120 toward the body 110, the locking hooks 148 are no longer locked to the locking portions 124b, such that the sliding base 140 may continue to slide relative to the plug 120 toward the body 110.

Figure 3A:
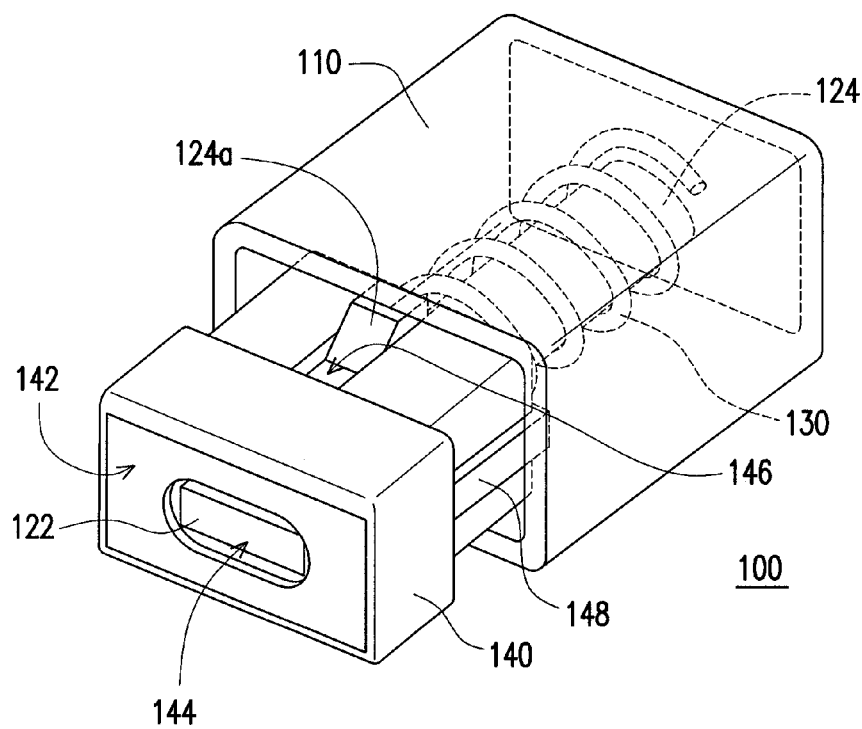
FIG. 3A is a schematic view illustrating the electric connector that is depicted in FIG. 1 but is in an initial state.
Figure 3B:
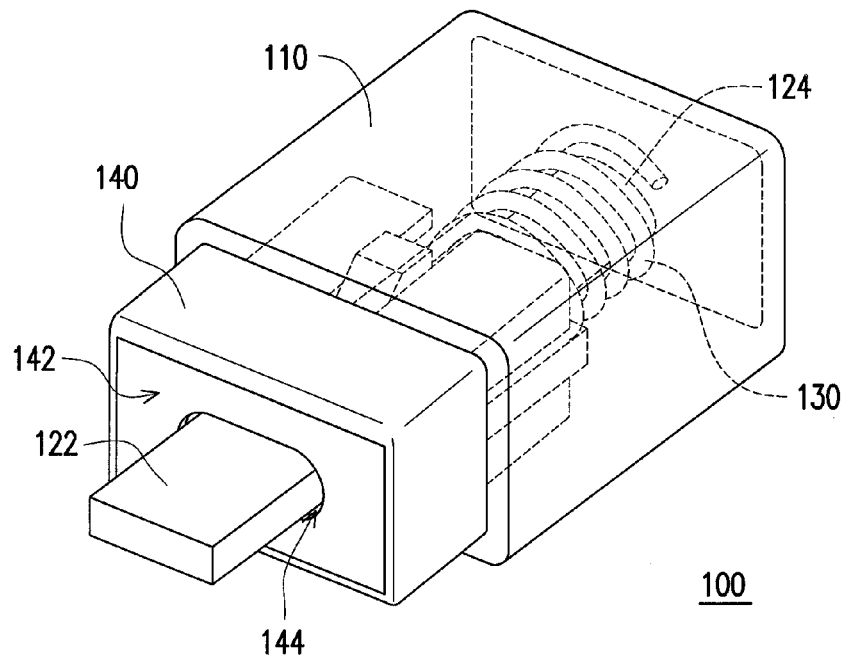
FIG. 3B is a schematic view illustrating the electric connector that is depicted in FIG. 1 but is in an inserted state.

FIG. 3A is a schematic view illustrating the electric connector that is depicted in FIG. 1 but is in an initial state. FIG. 3B is a schematic view illustrating the electric connector that is depicted in FIG. 1 but is in an inserted state. With reference to FIG. 1, FIG. 3A, and FIG. 3B, when the electric connector 100 is in an initial state as shown in FIG. 3A, the plug portion 122 of the plug 120 is located in the containing through hole 144 of the sliding base 140. When the electric connector 100 is to be inserted to the receptacle 410 of the portable electronic device 400, the electric connector 100 is moved toward the receptacle 410, and the at magnetic component 150 of the electric connector 100 on the sliding base 140 and the magnetic component 412 of the receptacle 410 are magnetically attracted, such that the containing through hole 144 of the sliding base 140 is aligned to the receptacle 410. The electric connector 100 is further pushed toward the receptacle 410, and the locking hooks 148 are no longer locked to the locking portions 124b, such that the sliding base 140 continues to slide toward the body 110.

Since the contact surface 142 of the sliding base 140 leans against the portable electronic device 400 and slides relative to the plug 120 toward the body 110, the reposition component 130 leaning against the body 110 and the sliding base 140 is pressed and thereby generates elastic displacement, and the plug portion 122 of the plug 120 protrudes from the contact surface 140 (as shown in FIG. 3B) and is inserted into and electrically connected to the receptacle 410. When the plug 120 of the electric connector 100 is again pulled away from the receptacle 410 of the portable electronic device 400, the reposition component 130 relieves the elastic displacement and pushes the sliding base 140 back to the initial location.

Figure 4A:
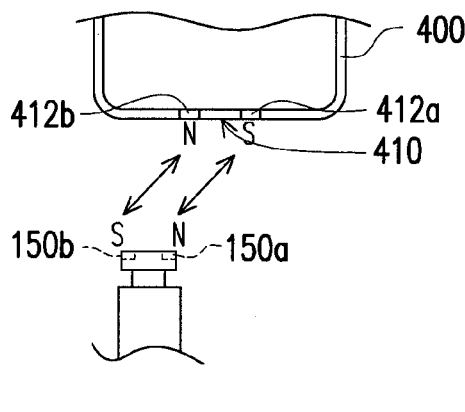
FIG. 4A and FIG. 4B are schematic views illustrating that the electric connector and the receptacle of the portable electronic device depicted in FIG. 1 are aligned to each other.
Figure 4B:
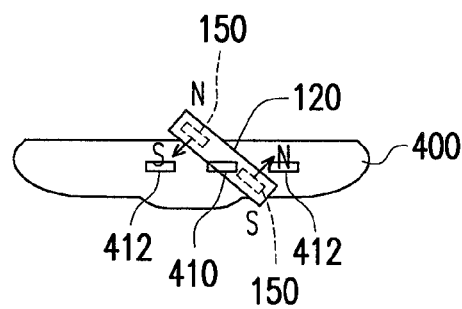

FIG. 4A and FIG. 4B are schematic views illustrating that the electric connector and the receptacle of the portable electronic device depicted in FIG. 1 are aligned to each other. With reference to FIG. 4A and FIG. 4B, in the present embodiment, the number of the magnetic component 150 of the electric connector 100 is two, and the number of the magnetic component 412 of the receptacle 410 is two as well. Magnetic polarities of the two magnetic components 150 of the electric connector 100 are different from each other, and the magnetic polarity of each of the two magnetic components 412 of the receptacle 410 is different from the magnetic polarity of the corresponding magnetic component 150 of the electric connector 100. For instance, the two magnetic components 150 of the electric connector 100 includes a first magnetic component 150a and a second magnetic component 150b, and the two magnetic components 412 of the receptacle 410 include a first magnetic component 412a and a second magnetic component 412b. If the first magnetic component 150a of the electric connector 100 has the N-pole polarity, the corresponding first magnetic component 412a of the receptacle 410 has the S-pole polarity; at this time, the second magnetic component 150b of the electric connector 100 has the S-pole polarity, and the corresponding second magnetic component 412b of the receptacle 410 has the N-pole polarity.

Thereby, as long as the electric connector 100 is located within the magnetic field of the magnetic components 412 of the receptacle 410, the plug 120 of the electric connector 100 is able to be aligned to the receptacle 410 of the portable electronic device 400 because the magnetic components 150 of the electric connector 100 and the magnetic components 412 of the receptacle 410 are magnetically attracted. In addition, even though the plug 120 of the electric connector 100 is not plugged into the receptacle 410 at a proper angle, the magnetic attraction between the magnetic components 150 of the electric connector 100 and the magnetic components 412 of the receptacle 410 may rectify said deficiency and rotate the electric connector 100 to be at the correct angle. As such, the problem of scratching the casing of the portable electronic device 400 (because the plug 120 is inserted into the receptacle 410 of the portable electronic device 400 at an improper angle) and the resultant damages to the receptacle 410 may be prevented.

Figure 5:
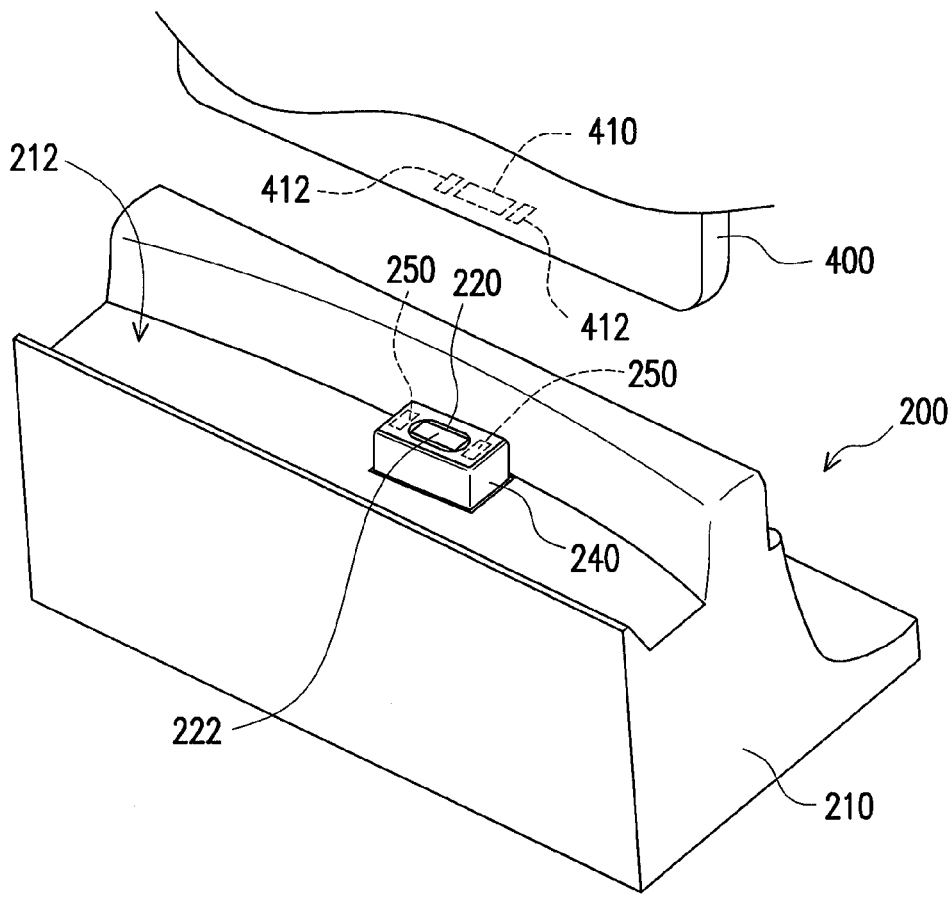
FIG. 5 is a schematic view illustrating a bracket and a portable electronic device according to an embodiment of the disclosure.

FIG. 5 is a schematic view illustrating a bracket and a portable electronic device according to an embodiment of the disclosure. With reference to FIG. 5 and FIG. 2, a bracket 200 described in the present embodiment is suitable for connecting a receptacle 410 of a portable electronic device 400. The bracket 200 described herein is similar to the electric connector 100 depicted in FIG. 2, while the main difference therebetween lies in that the body 210 of the bracket 200 has an accommodation chamber 212, and at least one portion of the portable electronic device 400 is adapted to be inserted into the accommodation chamber 212. The magnetic component 250 of the bracket 200 is placed on the sliding base 240, and a magnetic polarity of the magnetic component 250 of the bracket 200 is different from a magnetic polarity of the magnetic component 412 of the receptacle 410.

Thereby, as long as the magnetic component 412 of the receptacle 410 in the portable electronic device 400 is located within the magnetic field of the magnetic component 250 of the bracket 200, the plug 220 of the bracket 200 is able to be aligned to the receptacle 410 of the portable electronic device 400 because the magnetic component 250 of the bracket 200 and the magnetic component 412 of the receptacle 410 are magnetically attracted. At this time, the portable electronic device 400 is pushed toward the bracket 200, and the sliding base 240 slides relative to the plug 220 toward the body 210, such that the plug portion 222 (e.g., the plug portion 122 shown in FIG. 2) of the plug 220 protrudes from the sliding base 240 and is inserted into the receptacle 410. In the present embodiment, the portable electronic device 400 is a smart phone, and the bracket 200 may be a charge base of the smart phone. The bracket 200 is adapted to hold the portable electronic device 400, and the plug 220 of the bracket 200 is adapted to be inserted into the receptacle 410 of the portable electronic device 400, so as to provide the portable electronic device 400 with the required power. Note that the types of the bracket 200 and the portable electronic device 400 are not limited in the disclosure.

Figure 6A:
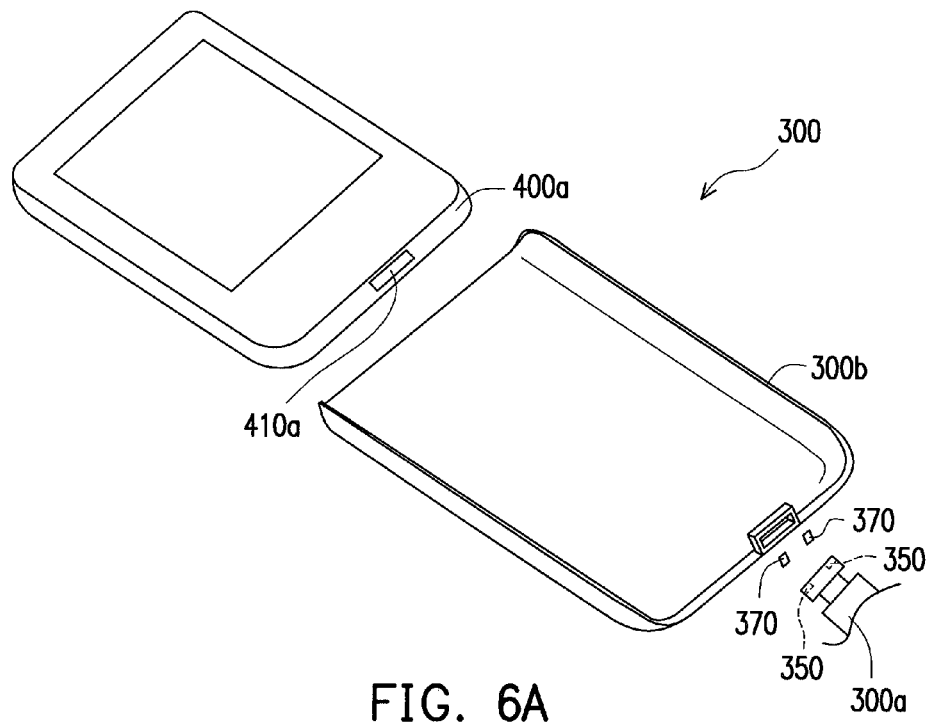
FIG. 6A is a schematic perspective view illustrating an electric connector assembly and a portable electronic device according to an embodiment of the disclosure.
Figure 6B:
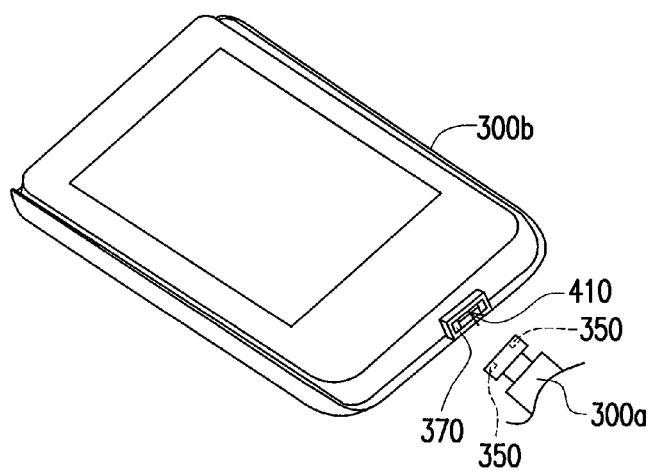
FIG. 6B is a schematic view illustrating that the electric connector assembly and the portable electronic device depicted in FIG. 6A are assembled to each other.

FIG. 6A is a schematic perspective view illustrating an electric connector assembly and a portable electronic device according to an embodiment of the disclosure. FIG. 6B is a schematic view illustrating that the electric connector assembly and the portable electronic device depicted in FIG. 6A are assembled to each other. With reference to FIG. 6A and FIG. 6B, an electric connector assembly 300 described in the present embodiment is suitable for connecting a receptacle 410a of a portable electronic device 400a. The electric connector assembly 300 includes an electric connector 300a and a casing 300b. The electric connector 300a and the portable electronic device 400a described herein are similar to the electric connector 100 and the portable electronic device 400 depicted in FIG. 2, while the main difference therebetween lies in that the receptacle 410a does not have the magnetic component, but the casing 300b has at least one magnetic component 370. The location of the magnetic component 370 of the casing 300b corresponds to the location of the magnetic component 350 (e.g., the magnetic component 150 shown in FIG. 2) of the electric connector 300a, and a magnetic polarity of the magnetic component 350 of the electric connector 300a is different from a magnetic polarity of the magnetic component 370 of the casing 300b. The casing 300b covers a portion of the portable electronic device 400a and exposes the receptacle 410a.

Thereby, as long as the magnetic component 370 of the casing 300b is located within the magnetic field of the magnetic component 350 of the electric connector 300a, the plug (e.g., the plug 120 shown in FIG. 2) of the electric connector 300a is able to be aligned to the receptacle 410a of the portable electronic device 400a because the magnetic component 350 of the electric connector 300a and the magnetic component 370 of the casing 300b are magnetically attracted.

At this time, the electric connector 300a is pushed toward the portable electronic device 400a, such that the plug is inserted into the receptacle 410a. In the present embodiment, the portable electronic device 400a is a smart phone, and the casing 300b is a protective casing of the smart phone. Note that the types of the casing 300b and the portable electronic device 400a are not limited in the disclosure.

To sum up, the magnetic component is configured on the sliding base of the electric connector, the plug is located in the containing through hole of the sliding base, and another magnetic component having a magnetic polarity different from that of the magnetic component on the sliding base is correspondingly configured on the receptacle of the portable electronic device. Since the magnetic component on the electric connector and the magnetic component on the portable electronic device are magnetically attracted, the plug of the electric connector is able to be aligned to the receptacle of the portable electronic device. Said concept may be further applied to place a magnetic component respectively around the plug of the bracket and the receptacle of the portable electronic device or place a magnetic component respectively around the receptacle of the electric connector and on a corresponding portion of the casing. Thereby, the plug may be easily aligned to the receptacle of the portable electronic device, and the problem of scratching the casing of the portable electronic device (because the plug is inserted into the receptacle of the portable electronic device at an improper angle) and the resultant damages to the receptacle may be prevented.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. An electric connector suitable for connecting a receptacle of a portable electronic device, the receptacle having at least one magnetic component, the electric connector comprising:
    a body;
    a plug having a plug portion and a fixed portion, the fixed portion being fixed to the body;
    a reposition component mounted to the fixed portion of the plug;
    a sliding base having a contact surface and a containing through hole, the plug being located in the containing through hole, the sliding base being suitable for sliding relative to the plug, two ends of the reposition component respectively leaning against the body and the sliding base; and
    at least one magnetic component fixed to the sliding base and corresponding to the at least one magnetic component of the receptacle, a magnetic polarity of the at least one magnetic component of the electric connector being different from a magnetic polarity of the at least one magnetic component of the receptacle,
    wherein when the electric connector approaches the receptacle, the at least one magnetic component of the electric connector on the sliding base and the at least one magnetic component of the receptacle are magnetically attracted, such that the containing through hole of the sliding base is aligned to the receptacle, the electric connector is pushed toward the receptacle, and the contact surface of the sliding base leans against the portable electronic device and slides relative to the plug toward the body, such that the plug portion of the plug protrudes from the contact surface and is inserted into and electrically connected to the receptacle.

2. The electric connector as recited in claim 1, wherein the at least one magnetic component of the electric connector is placed on the contact surface of the sliding base.

3. The electric connector as recited in claim 1, wherein the number of the at least one magnetic component of the electric connector is two, the number of the at least one magnetic component of the receptacle is two as well, the magnetic polarities of the two magnetic components of the electric connector are different from each other, and the magnetic polarity of each of the two magnetic components of the receptacle is different from the magnetic polarity of the corresponding magnetic component of the electric connector.

4. The electric connector as recited in claim 1, wherein the fixed portion comprises at least one locking portion, the sliding base comprises at least one locking hook extended in a direction away from the contact surface of the sliding base, and when the sliding base slides relative to the plug in a direction away from the body, the at least one locking hook is adapted to be locked to the at least one locking portion, so as to limit the sliding base to be located on the plug.

5. The electric connector as recited in claim 1, wherein the fixed portion further comprises a sliding block, the sliding base further comprises a sliding groove, and the sliding block is slidably configured in the sliding groove, such that the sliding base is suitable for sliding relative to the plug.

6. The electric connector as recited in claim 1, further comprising an adhesive tape, so as to adhere the at least one magnetic component of the electric connector to the sliding base.

7. A bracket suitable for connecting a receptacle of a portable electronic device, the receptacle having at least one magnetic component, the bracket comprising:
    an electric connector comprising:
        a body having an accommodation chamber, wherein at least one portion of the portable electronic device is adapted to be inserted into the accommodation chamber;
        a plug having a plug portion and a fixed portion, the fixed portion being fixed into the accommodation chamber of the body;
        a reposition component mounted to the fixed portion of the plug;
        a sliding base having a contact surface and a containing through hole, the plug being located in the containing through hole, the sliding base being suitable for sliding relative to the plug, two ends of the reposition component respectively leaning against the body and the sliding base; and
        at least one magnetic component placed on the sliding base and corresponding to the at least one magnetic component of the receptacle, a magnetic polarity of the at least one magnetic component of the electric connector being different from a magnetic polarity of the at least one magnetic component of the receptacle,
    wherein when the portable electronic device is to be inserted into the accommodation chamber of the bracket, the at least one magnetic component of the electric connector on the sliding base and the at least one magnetic component of the receptacle are magnetically attracted, such that the containing through hole of the sliding base is aligned to the receptacle, the portable electronic device is pushed toward the sliding base, and the contact surface of the sliding base leans against the portable electronic device and slides relative to the plug toward the body, such that the plug portion of the plug protrudes from the contact surface and is inserted into and electrically connected to the receptacle.

8. The bracket as recited in claim 7, wherein the at least one magnetic component of the bracket is placed on the contact surface of the sliding base.

9. The bracket as recited in claim 7, wherein the number of the at least one magnetic component of the electric connector is two, the number of the at least one magnetic component of the receptacle is two as well, the magnetic polarities of the two magnetic components of the electric connector are different from each other, and the magnetic polarity of each of the two magnetic components of the receptacle is different from the magnetic polarity of the corresponding magnetic component of the electric connector.

10. The bracket as recited in claim 7, wherein the fixed portion comprises a locking portion, the sliding base comprises at least one locking hook extended in a direction away from the contact surface of the sliding base, and when the sliding base slides relative to the plug in a direction away from the body, the at least one locking hook is adapted to be locked to the locking portion, so as to limit the sliding base to be located on the plug.

11. The bracket as recited in claim 7, wherein the fixed portion further comprises a sliding block, the sliding base further comprises a sliding groove, and the sliding block is slidably configured in the sliding groove, such that the sliding base is suitable for sliding relative to the plug.

12. The bracket as recited in claim 7, further comprising an adhesive tape, so as to adhere the at least one magnetic component of the bracket to the sliding base.

13. An electric connector assembly suitable for connecting a receptacle of a portable electronic device, the electric connector assembly comprising:
   an electric connector comprising:
      a body;
      a plug having a plug portion and a fixed portion, the fixed portion being fixed to the body;
      a reposition component mounted to the fixed portion of the plug;
      a sliding base having a contact surface and a containing through hole, the plug being located in the containing through hole, the sliding base being suitable for sliding relative to the plug, two ends of the reposition component respectively leaning against the body and the sliding base; and
      at least one magnetic component placed on the sliding base; and
   a casing covering a portion of the portable electronic device and exposing the receptacle, the casing of the electric connector assembly having at least one magnetic component corresponding to the at least one magnetic component of the electric connector, a magnetic polarity of the at least one magnetic component of the electric connector being different from a magnetic polarity of the at least one magnetic component of the casing,
   wherein when the electric connector approaches the receptacle, the at least one magnetic component of the electric connector on the sliding base and the at least one magnetic component of the casing are magnetically attracted, such that that the containing through hole of the sliding base is aligned to the receptacle, the electric connector is pushed toward the receptacle, and the contact surface of the sliding base leans against the portable electronic device and slides relative to the plug in a direction away from the receptacle, such that the plug portion of the plug protrudes from the contact surface and is inserted into and electrically connected to the receptacle.

14. The electric connector assembly as recited in claim 13, wherein the at least one magnetic component of the electric connector is placed on the contact surface of the sliding base.

15. The electric connector assembly as recited in claim 13, wherein the number of the at least one magnetic component of the electric connector is two, the number of the at least one magnetic component of the casing is two as well, the magnetic polarities of the two magnetic components of the electric connector are different from each other, and the magnetic polarity of each of the two magnetic components of the casing is different from the magnetic polarity of the corresponding magnetic component of the electric connector.

16. The electric connector assembly as recited in claim 13, wherein the fixed portion comprises a locking portion, the sliding base comprises at least one locking hook extended in a direction away from the contact surface of the sliding base, and when the sliding base slides relative to the plug in a direction away from the body, the at least one locking hook is adapted to be locked to the locking portion, so as to limit the sliding base to be located on the plug.

17. The electric connector assembly as recited in claim 13, wherein the fixed portion further comprises a sliding block, the sliding base further comprises a sliding groove, and the sliding block is slidably configured in the sliding groove, such that the sliding base is suitable for sliding relative to the plug.

18. The electric connector assembly as recited in claim 13, further comprising an adhesive tape, so as to adhere the at least one magnetic component of the electric connector to the sliding base.

* * * * *